United States Patent [19]

Mülhaupt et al.

[11] Patent Number: 4,952,645
[45] Date of Patent: Aug. 28, 1990

[54] EPOXIDE RESINS CONTAINING POLYESTERS BASED ON POLYALKYLENE GLYCOLS

[75] Inventors: Rolf Mülhaupt, Marly, Switzerland; Julia Möckel-Weber, Schopfhein, Fed. Rep. of Germany

[73] Assignee: Ciba-Geigy Corporation, Ardsley, N.Y.

[21] Appl. No.: 287,581

[22] Filed: Dec. 16, 1988

Related U.S. Application Data

[62] Division of Ser. No. 130,488, Dec. 9, 1987, abandoned.

[30] Foreign Application Priority Data

Dec. 19, 1986 [CH] Switzerland ............. 5097/86

[51] Int. Cl.$^5$ ............................................. C08G 59/42
[52] U.S. Cl. ............................. 525/438; 528/100; 528/110; 528/111.3; 528/295.3; 528/297; 528/361
[58] Field of Search ............. 525/438; 528/110, 295.3, 528/100

[56] References Cited

U.S. PATENT DOCUMENTS

| | | | |
|---|---|---|---|
| 2,830,031 | 4/1958 | Fisch | 528/110 |
| 3,268,477 | 8/1966 | Mueller | 528/297 |
| 3,280,077 | 12/1966 | Case et al. | 528/297 |
| 3,299,008 | 1/1967 | Mueller | 528/110 |
| 3,316,277 | 8/1967 | Frank et al. | 528/100 |
| 3,397,254 | 8/1968 | Wynstra et al. | 525/438 |
| 3,404,018 | 9/1968 | Hicks | 528/110 |
| 3,523,143 | 8/1970 | Kwong | 528/110 |
| 3,547,881 | 12/1970 | Mueller et al. | 528/100 |
| 3,557,035 | 1/1971 | Schmid et al. | 525/438 |
| 3,576,903 | 4/1971 | Groff | 528/297 |
| 3,624,180 | 11/1971 | Schmid et al. | 525/438 |
| 3,641,064 | 2/1972 | Heer et al. | 549/557 |
| 3,641,194 | 2/1972 | Schmid et al. | 525/438 |
| 3,642,674 | 2/1972 | Schmid et al. | 528/297 |
| 3,642,938 | 2/1972 | Schmid et al. | 525/438 |
| 3,694,257 | 9/1972 | Dumont | 428/262 |
| 3,723,568 | 3/1973 | Hoeschele | 525/438 |
| 3,723,569 | 3/1973 | Hoeschele | 525/438 |
| 3,812,064 | 5/1974 | Nichols | 528/111.3 |
| 3,816,365 | 6/1974 | Schmid et al. | 528/297 |
| 4,226,755 | 10/1980 | Knecht | 528/110 |
| 4,340,716 | 7/1982 | Hata et al. | 528/100 |
| 4,343,743 | 8/1982 | Coquard et al. | 260/404.5 |
| 4,490,266 | 12/1984 | Hentschel et al. | 252/49.8 |
| 4,497,945 | 2/1985 | Salloum et al. | 528/110 |
| 4,703,101 | 10/1987 | Singer et al. | 528/297 |

FOREIGN PATENT DOCUMENTS

1017612  1/1963  United Kingdom .
1300731  12/1972  United Kingdom .

OTHER PUBLICATIONS

Chem. Abst. 89, 130428u (1978).

*Primary Examiner*—John Kight, III
*Assistant Examiner*—Frederick Krass
*Attorney, Agent, or Firm*—Luther A. R. Hall

[57] ABSTRACT

The present invention relates to compositions containing (a) at least one compound having at least one 1,2-epoxide group in its molecule and (b) at least one compound of the formulae I, II, III or IV

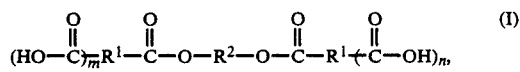

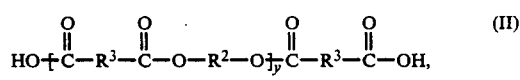

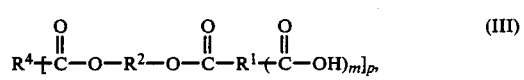

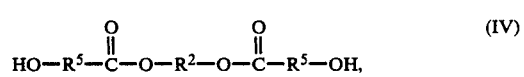

in which m and n independently of one another are 1 or 2, y is an integer from 2 to 10, p is 3 or 4, $R^1$, $R^3$ and $R^4$ are derived from radicals of aliphatic, cycloaliphatic or aromatic carboxylic acids, $R^1$ being a divalent or trivalent radical, $R^3$ being a divalent radical and $R^4$ being a trivalent or tetravalent radical, after the removal of the carboxyl groups, $R^5$ is a divalent radical of an aromatic hydroxycarboxylic acid after the removal of the carboxyl group and of the phenolic hydroxyl group and $R^2$ is the radical of an aliphatic or cycloaliphatic diol after the removal of the two hydroxyl groups, subject to the proviso that at least 70% by weight of the radicals $R^1$ or $R^3$, relative to the total amount of these radicals, are derived from dimeric and/or trimeric fatty acids, that at least 70% by weight of the radicals $R^2$, relative to the total amount of these radicals, are groups of the formula V

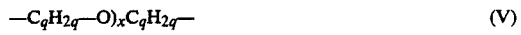

in which x is an integer from 5 to 40 and q is 3 or 4, or up to 30% by weight within a radical of formula V can also be groups in which q=2, and that the radicals $R^1$, $R^2$, $R^3$ and $R^5$ and the indices x and q in a molecule can be different within the definitions given.

The cured epoxide resin mixtures exhibit a very good low-temperature flexibility and resistance to corrosion.

13 Claims, No Drawings

EPOXIDE RESINS CONTAINING POLYESTERS BASED ON POLYALKYLENE GLYCOLS

This application is a division, of application Ser. No. 130,488, filed 12/9/87, now abandoned.

The present invention relates to an epoxide mixture containing polyesters based on polyalkylene oxides, to selected polyesters, to the use of the polyesters as plasticizers for epoxide resins and to the use of selected epoxide mixtures as corrosion-resistant adhesives.

In general, cured epoxide resins are very brittle materials and have very low values of flexural strength and impact strength. In order to counteract this brittleness, epoxide-terminated elastic prepolymers, for example epoxide adducts of carboxyl-terminated or amino-terminated butadiene/acrylonitrile copolymers, are added to the epoxide resin as plasticizers. In so doing it must be borne in mind that the effect of such additives is often to cause a considerable increase in the viscosity of the epoxide resin mixtures, which makes processing more difficult. Polyesters have also been suggested as plasticizing additives, but instability to hydrolysis, increased water absorption and serious decreases in tensile shear strength after storage in a moist, hot corrosion-promoting atmosphere are often observed in these cases.

Diglycidyl esters of carboxyl-terminated polyesters based on aromatic dicarboxylic acids and polyalkylene glycols are described in German Auslegeschrift No. 1,816,096. Depending on the type of resin and/or curing agent, the epoxide resins can be processed to give highly or slightly flexible articles or to give rubber-elastic articles. The water absorption of the cured products still leaves something to be desired; as a rule, losses in strength when stored in water are also observed.

Disadvantages of this type are also found with other epoxide mixtures containing polyesters as plasticizers.

Carboxyl-terminated polyesters which can be employed as epoxide curing agents are described in U.S. Pat. No. 3,397,254. These polyesters are derived from cyclic dicarboxylic acids. The alcohol components used are, inter alia, alkylene glycols, including also dipropylene glycol or triethylene glycol. According to the illustrative embodiments, propylene glycol or diethylene glycol are preferably employed as the alcohol components. In comparison with the types having longer polyalkylene glycol units, the polyesters resulting from this have an increased water absorption and a lower plasticizing effect.

Adducts formed from an epoxide resin and a carboxyl-terminated polyester or polyamide are described in U.S. Pat. No. 3,576,903. The compounds can be processed, in combination with a curing agent, to give flexible and rapidly curable coatings.

Finally, polyesters formed from aliphatic diols and alicyclic and aliphatic dicarboxylic acids, which can be employed as adducts for an epoxide resin as an epoxide curing agent and which provide products having good flexibility are known from Japanese Published Specification No. 53-40,100.

Carboxyl-terminated polyesters formed from cyclic dicarboxylic acids, a dihydric or polyhydric polyol and an alkylene oxide component are described in U.S. Pat. No. 3,280,077. The polyesters are suitable for use as replacements for epoxide resins. Resin formulations having an epoxide content of less than 50% by weight are prepared, but these only have short polyalkylene oxide segment lengths.

Polyesters derived from polyols, inter alia polyalkylene glycols, and cyclic carboxylic anhydrides are known from U.S. Pat. No. 3,299,008. It is preferable to use cyclic anhydrides of aliphatic carboxylic acids or cycloaliphatic carboxylic anhydrides having less than 20 C atoms. The compounds are employed as epoxide plasticizers.

In order to increase the resistance to hydrolysis, epoxide resin mixtures containing, in addition, a block copolyester consisting of segments containing short-chain diol radicals or long-chain polyalkylene oxide radicals, are suggested in U.S. Pat. No. 3,723,569. The copolyesters impart excellent resistance to hydrolysis and a combination of good strength and good low-temperature properties to the mixtures. The$e copolyesters are partly crystalline; they therefore j contain regions having high intermolecular interactions. When copolyesters of this type are mixed into epoxide resins, therefore, solubility problems can occur; in addition, the copolyester-epoxide resin mixtures have a relatively high viscosity, so that problems can arise when they are processed.

Polyesters based on dimeric fatty acids and polybutylene oxide are known from EP-A No. 30,904. The compounds are used as intermediates in the preparation of polyester-amides.

A selected class of polyester plasticizers has now been found, which, in addition to low viscosity values, provide a combination of high strength with good plasticity even at low temperatures and also good stability in a corrosive environment. Phenol-terminated, flexible polyesters based on polyalkylene oxides, which are suitable for use as reactive, plasticizing reactive thinners and, as a rule, require no pre-adduct formation with the epoxide resin have also been found.

The present invention relates to a composition containing (a) at least one compound having at least one 1,2-epoxide group in its molecule and
(b) at least one compound of the formulae I, II, III or IV

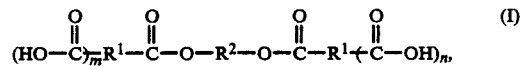

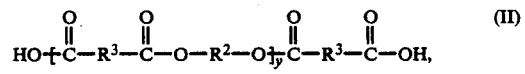

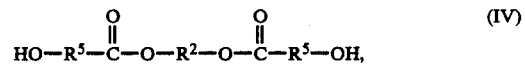

in which m and n independently of one another are 1 or 2, y is an integer from 2 to 10, p is 3 or 4, $R^1$, $R^3$ and $R^4$ are derived from radicals of aliphatic, cycloaliphatic or aromatic carboxylic acids, $R^1$ being a divalent or trivalent radical, $R^3$ being a divalent radical and $R^4$ being a trivalent or tetravalent radical, after the removal of the carboxyl groups, $R^5$ is a divalent radical of an aromatic hydroxycarboxylic acid after the removal of the carboxyl group and of the phenolic hydroxyl group and $R^2$ is the radical of an aliphatic or cycloaliphatic diol after the removal of the two hydroxyl groups, subject to the proviso that at least 70% by weight of the radicals $R^1$ or $R^3$, relative to the total amount of these radicals, are derived from dimeric and/or trimeric fatty acids, that at least 70% by weight of the radicals $R^2$, relative to the total amount of these radicals, are groups of the formula V

  (V), in which x is an integer from 5 to 40 and q is 3 or 4, or up to 30% by weight within a radical of formula V can also be groups in which q=2, and that the radicals $R^1$, $R^2$, $R^3$ and $R^5$ and the indices x and q in a molecule can be different within the definitions given.

As a rule, any aliphatic, cycloaliphatic, aromatic, araliphatic or heterocyclic epoxide resins are suitable as the component (a) of the compositions of this invention. It is also possible to employ mixtures of these resins.

Preferred epoxide resins contain at least two radicals of the formula VI

  (VI)

these radicals being directly attached to oxygen; nitrogen or sulfur atoms, and $R^6$ being hydrogen or methyl.

The following should be mentioned as examples of epoxide resins of this type:

(I) Polyglycidyl and poly-(β-methylglycidyl) esters which can be obtained by reacting a compound having at least two carboxyl groups in its molecule with epichlorohydrin or β-methylepichlorohydrin, respectively. The reaction is advantageously carried out in the presence of bases.

Aliphatic polycarboxylic acids can be used as a compound having at least two carboxyl groups in its molecule. Examples of these polycarboxylic acids are oxalic acid, succinic acid, glutaric acid, adipic acid, pimelic acid, suberic acid, azelaic acid, sebacic acid or dimerized or trimerized linoleic acid.

It is also possible, however, to employ cycloaliphatic polycarboxylic acids, for example tetrahydrophthalic acid, 4-methyltetrahydrophthalic acid, hexahydrophthalic acid or 4-methylhexahydrophthalic acid.

It is also possible to use aromatic polycarboxylic acids, for example phthalic acid, isophthalic acid or terephthalic acid.

(II) Polyglycidyl or poly-(β-methylglycidyl) ethers which can be obtained by reacting a compound having at least two free alcoholic hydroxyl groups and/or phenolic hydroxyl groups with a suitably substituted epichlorohydrin under alkaline conditions, or in the presence of an acid catalyst, with subsequent treatment with alkali; or which can be obtained by so-called advancing in a manner known per se a bis-epoxide compound with a bisphenol.

Ethers of this type are derived, for example, from acyclic alcohols, such as ethylene glycol, diethylene glycol and higher poly-(oxyethylene) glycols, propane-1,2-diol or poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins.

They are, however, also derived, for example, from cycloaliphatic alcohols, such as 1,3-dihydroxycyclohexane, 1,4-dihydroxycyclohexane, bis-(4-hydroxycyclohexyl)-methane, 2,2-bis-(4-hydroxycyclohexyl)-propane or 1,1-bis-(hydroxymethyl)-cyclohex-3-ene, or they contain aromatic nuclei, such as N,N-bis-(2-hydroxyethyl)-aniline or p,p'-bis-(2-hydroxyethylamino)-diphenylmethane.

The epoxide compounds can also be derived from mononuclear phenols, for example resorcinol or hydroquinone; or they are based on polynuclear phenols, for example bis-(4-hydroxyphenyl)-methane, 4,4'-dihydroxydiphenyl, bis-(4-hydroxyphenyl) sulfone, 1,1,2,2-tetrakis-(4-hydroxyphenyl)-ethane, 2,2-bis-(4-hydroxyphenyl)-propane and 2,2-bis-(3,5-di-bromo-4-hydroxyphenyl)-propane, and novolaks which can be obtained by subjecting aldehydes, for example, formaldehyde, acetaldehyde, chloral or furfuraldehyde, to a condensation reaction with phenols, such as phenol, or with phenols which are substituted in the nucleus by chlorine atoms or $C_1$–$C_9$-alkyl groups, for example 4-chlorophenol, 2-methylphenol or 4-tert.-butylphenol, or which can be obtained by a condensation reaction with bisphenols, as described above.

The epoxide compounds can, however, also be derived from the reaction of diglycidyl ethers of dihydric phenols, for example 2,2-bis-(4-hydroxyphenyl)-propane, with dihydric phenols, for example 2,2-bis-(4-hydroxyphenyl)-propane.

(III) Poly-(N-glycidyl) compounds can be obtained, for example, by dehydrochlorinating the reaction products of epichlorohydrin with amines containing at least two amino hydrogen atoms. Examples of these amines are aniline, n-butylamine, bis-(4-aminophenyl)-methane, m-xylylenediamine or bis-(4-methylaminophenyl)-methane.

The poly-(N-glycidyl) compounds also include, however, triglycidyl isocyanurate, N,N'-diglycidyl derivatives of cycloalkyleneureas, such as ethyleneurea or 1,3-propyleneurea, and N,N'-diglycidyl derivatives of hydantoins, such as 5,5-dimethylhydantoin.

(IV) Examples of poly-(S-glycidyl) compounds are di-S-glycidyl derivatives derived from dithiols, for example ethane-1,2-dithiol or bis-(4-mercaptomethylphenyl) ether.

It is also possible, however, to use epoxide resins in which the 1,2-epoxide groups are attached to different heteroatoms or functional groups; these compounds include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

Epoxide resins in which some or all of the epoxide groups are in a central position, such as vinylcyclohexene dioxide, Limonene dioxide, dicyclopentadiene dioxide, bis-(2,3-epoxy-cyclopentyl) ether, 2,3-epoxycyclopentyl glycidyl ether, 4-oxatetracyclo[6.2.1.0$^{2,7}$.0$^{3,5}$]undec-9-yl glycidyl ether, 1,2-bis-(4-oxatetracyclo[6.2.1.0$^{2,7}$.0$^{3,5}$]undec-9-yloxy)-ethane, the 3,4-epoxycyclohexylmethyl ester of 3',4'-epoxy-cyclohexanecarboxylic acid and the 6,6'-dimethyl derivative thereof, the bis-(3,4-epoxycyclohexanecarboxylic acid ester) of ethylene glycol, the bis-adipic acid ester of 3,4-epoxy-6-methylcyclohexanemethylol or 3-(3,4- epoxycyclohexyl)-8,9-epoxy-2,4-dioxaspiro[5.5]undecane, are also suitable.

Epoxide resins which are particularly preferred are polyglycidyl ethers of bisphenols, for example 2,2-bis-(4-hydroxyphenyl)-propane or bis-(hydroxyphenyl)-methane (mixture of isomers) or, in particular, the so-called advanced types based on 2,2-bis-(4-hydroxyphenyl)-propane diglycidyl ether with 2,2-bis-(4-hydroxyphenyl)-propane, of novolaks formed by reacting formaldehyde with a phenol, or of the aliphatic polyols mentioned above, in particular butane-1,4-diol or pentaerythritol. The diglycidyl esters of the dicarboxylic acids mentioned above are also preferred as epoxide resins.

The radicals $R^1$ and $R^3$ are principally derived from dimeric fatty acids or trimeric fatty acids. These are dicarboxylic acids or tricarboxylic acids, respectively, which can be obtained by dimerizing or trimerizing ethylenically unsaturated carboxylic acids. Dimeric or trimeric fatty acids of this type can contain aliphatic and cycloaliphatic structural elements. They can be saturated or unsaturated. The hydrogenated types are preferred. A review of structures, chemical and physical properties and the preparation of dimeric and trimeric fatty acids is available in Kirk-Othmer, Encyclopaedia of Chemical Technology, volume 7, 768–781 (1979). As a rule, these products are mixtures of dicarboxylic or tricarboxylic acids having more than 30 C atoms; dimeric or trimeric fatty acids having 36 to 54 C atoms are preferred.

Dimeric fatty acids are commercially avilable under the name "PRIPOL®", "EMPOL®" or "UNEM®". These products contain in some cases different proportions of trimeric acids; the products can also be pure trimeric acids.

$R^1$ and $R^3$ can, to a certain extent, be divalent radicals of an aliphatic carboxylic acid after the carboxyl groups have been removed; these are, as a rule, linear or branched-chain alkylene radicals derived, in particular, from $\alpha,\omega$-alkylenedicarboxylic acids. The alkylene chains can, if appropriate, be interrupted by oxygen or sulfur atoms and can, if appropriate, contain ethylenically unsaturated bonds.

Saturated, linear $C_2$–$C_{30}$-alkylene radicals are preferred.

Examples of these radicals are ethylene, trimethylene, tetramethylene, pentamethylene, hexamethylene, heptamethylene, octamethylene, decamethylene, dodecamethylene, tetradecamethylene, hexadecamethylene, octadecamethylene, eicosamethylene, docosamethylene or tricosamethylene.

If portions of the radicals $R^1$, $R^3$ or $R^4$ are derived from a cycloaliphatic carboxylic acid, these radicals are, for example, divalent, trivalent or tetravalent cycloaliphatic radicals having 5 to 7 ring carbon atoms. Radicals of this type are derived, for example, from hexahydrophthalic acid, hexahydroisophthalic acid or hexahydroterephthalic acid.

If portions of the radicals $R^1$, $R^3$ or $R^4$ are derived from an aromatic carboxylic acid, these radicals are, for example, divalent, trivalent or tetravalent aromatic radicals, or, if desired, systems which are condensed or linked via bridge groups.

These radicals are preferably benzene nuclei, if desired, biphenyl attached via a bridge, or naphthalene; they are especially benzene nuclei.

Examples of aromatic carboxylic acids from which these radicals are derived are phthalic acid, isophthalic acid, terephthalic acid, trimellitic acid, trimesic acid, pyromellitic acid, 3,3',4,4'-benzophenonetetracarboxylic acid, 3,3',4,4'-tetracarboxybiphenyl, 4,4'-dicarboxydiphenylmethane, 3,3',4,4'-tetracarboxydiphenylmethane, 4,4'-dicarboxydiphenyl ether or 1,4,5,8-tetracarboxynaphthalene.

Preferred aromatic co-components $R^3$ are 1,2-phenylene and 1,4-phenylene, especially 1,2-phenylene.

Preferred aromatic co-components $R^1$ are 1,2-phenylene, 1,4-phenylene, 1,2,4-benzenetriyl or 1,3,5-benzenetriyl. Aromatic radicals $R^1$ which are very particularly preferred are 1,2-phenylene and 1,2,4-benzenetriyl.

Preferred aromatic radicals $R^4$ are 1,2,4-benzenetriyl, 1,3,5-benzenetriyl or 1,2,4,5-benzenetetrayl. 1,3,5-benzenetriyl is very particularly preferred.

The radical of an aromatic hydroxycarboxylic acid on which $R^5$ is based is derived, for example, from a hydroxybenzenemonocarboxylic acid. More highly condensed derivatives are also possible, however, for example monocarboxylic acids of $\alpha$-naphthol or $\beta$-naphthol can also be used.

Examples of preferred radicals $R^5$ are 1,2-, 1,3- or 1,4-phenylene. $R^5$ is preferably a 1,2-phenylene or 1,4-phenylene radical, but is especially a 1,4-phenylene radical.

The radicals of the formula V are derived from polyalkylene oxides having $C_3$–$C_4$-alkylene oxide units. The segments must have a certain minimum length (x=5) in order to impart an adequate flexibility to the polyester. The radicals of the formula V are preferably derived from propylene oxide, particularly preferably from butylene oxide. The structural elements involved therefore have the formulae —(O—CH(CH$_3$)—CH$_2$)$_{x+1}$— or —(O—CH$_2$—CH$_2$—CH$_2$—CH$_2$)$_{x+1}$—(x=5–40).

The structural elements of the formula V can also be present as mixtures within a polyester molecule. It is also possible, of course, to use copolyether segments of the formula V, that is to say radicals of the formula V in which the index q has different meanings within a radical. In this embodiment it is also possible for up to 30% by weight of ethylene glycol units (q=2) to be co-condensed.

It is also preferable to employ mixtures of propylene oxide and butylene oxide units (mixtures within a polyester molecule or copolyethers). The preferred ratio by weight of propylene oxide to butylene oxide units in this embodiment is 1:9 to 9:1.

In addition to the radicals of the formula V, up to 30% by weight of other aliphatic diol radicals can also be present as co-components. These are, as a rule, linear or branched $C_2$–$C_{12}$-alkylene radicals. Examples of the diols on which they are based are ethylene glycol, propylene glycol, butylene glycol, neopentyl glycol, 1,6-hexanediol, 1,8-octanediol, 1,10-decanediol or 1,12-dodecanediol.

In addition to the radicals of the formula V, up to 30% by weight of other cycloaliphatic diol radicals can also be present as co-components. These are, as a rule, monocyclic diol radicals derived, for example, from 1,3-cyclohexanediol, 1,4-cyclohexanediol or 1,4-cyclohexanedimethanol.

The polyesters of the formulae I to IV are distinguished, as a rule, by a particularly low viscosity, which greatly facilitates the processing of the composition according to the invention.

As a rule, the polyesters of the formulae I to IV have softening points below 30° C. and preferably are liquid at 25° C.. They can, therefore, be incorporated without difficulty into the appropriate epoxide resins, and mixtures having a relatively low viscosity are then formed.

The polyesters preferably have a viscosity less than 80,000, in particular less than 30,000, mPas (measured at 25° C. using the Epprecht viscometer).

The plasticizing action of the polyesters of the formulae I to IV is determined, to a great extent, by the number of reactive end groups and by the nature of the plasticizing polyalkylene glycol segments.

In particular, carboxyl-terminated polyesters having an acid number less than 2.0 milliequivalents/g, particularly preferably an acid number of 0.5–1.5 milliequivalents/g, have proved successful in practice.

The phenol-terminated polyesters preferably have a phenolic OH number of 0.5–4.5 milliequivalents/g.

Compositions, as defined above, having viscosities less than 50,000 mPas, particularly less than 20,000 mPas and very particularly less than 15,000 mPas (measured at 25° C. using the Epprecht viscometer) are preferred.

These viscosity data preferably refer to mixtures containing 1:1 (parts by weight) mixtures of polyesters I, II or III and bisphenol A diglycidyl ether.

The indices m and n preferably have identical values; it is particularly preferably for them to be 1.

The index p is preferably 3.

The index x determines the length of the polyoxyalkylene chain; x is preferably an integer from 8 to 40 and very particularly preferably is an integer from 10 to 30. The molecular weight (number average) of the polypropylene glycol or polybutylene glycol units is preferably between 600 and 2,500.

The index y determines the length of the polyester chain; y is preferably an integer from 2 to 6, and very particularly preferably is 2 or 3.

The index q determines the length of the alkylene radical in the polyalkylene glycol group; q is preferably 4.

Compositions, as defined above, in which the component (b) consists of compounds of the formula I or II are very particularly preferred.

Compositions containing polyesters of the formulae I or II in which all the radicals $R^1$ or $R^3$ are derived from dimeric fatty acid(s) or, in the case of $R^1$, also from trimeric fatty acid(s) are very particularly preferred.

By combining hydrophobic dimeric or trimeric fatty acid radicals with hydrophilic polyalkylene oxide radicals in one molecule it is possible to provide an epoxide additive which has a plasticizing action and a low water absorption. This combination of properties which are in themselves opposed is extremely desirable, since mixtures containing these polyesters make it possible to prepare corrosion-resistant adhesives or castings of high dimensional stability. Previously known epoxide plasticizers based on polyalkylene oxides absorb, by virtue of their polar structure, a relatively large amount of water; this results, as a rule, in swelling phenomena and in a decrease in corrosion resistance.

Compositions which are very particularly preferred are those containing polyesters of the formulae I or II in which at least 70% by weight, preferably all, of the radicals $R^1$ or $R^3$ are derived from dimeric fatty acid(s) or, in the case of $R^1$, also from trimeric fatty acid(s), all the radicals $R^2$ are a group of the formula $-(CH(CH_3)-CH_2-O)_x-CH(CH_3)-CH_2-$ or preferably $-(CH_2-CH_2-CH_2-CH_2-O_x)-CH_2-CH_2-CH_2-CH_2-$, x is an integer from 10–30 and y is an integer from 2–6, preferably 2 or 3.

The polyesters of the formulae III and IV are novel and also form a subject of this invention.

The preparation of the polyesters of the formulae I, II, III or IV is effected in a manner known per se by polycondensing (a) one molar proportion of diol with two molar proportions of polycarboxylic acid(anhydride) or hydroxycarboxylic acid (polyester I or IV, respectively), (b) one molar proportion of diol with one to two molar proportions of polycarboxylic acid(anhydride) (polyester II), or (c) one molar proportion of a tribasic or tetrabasic carboxylic acid with three or four molar proportions of diol and subsequently masking the end groups with three or four molar proportions of polycarboxylic acid(anhydride) (polyester III).

It is also possible to prepare a hydroxyl-terminated polyester by condensing the corresponding molar amounts of diol and polycarboxylic acid(anhydride) and then masking this polyester in a further stage by reacting it with a further polycarboxylic acid(anhydride).

It is, of course, also possible to polycondense mixtures of diol components and/or polycarboxylic acid components.

It is also possible to employ the corresponding polyester-forming carboxylic acid derivatives, for example the esters or the acid chlorides, instead of the polycarboxylic acid(anhydrides).

The starting materials are generally known and in some cases are commercially available.

The polyester resins can be prepared by general procedures which are used for the preparation of such resins. Thus the esterification can be carried out advantageously by melt condensation of the carboxylic acid component(s) and the diol. The reactants are then heated up to a temperature of 240° C. for example, with stirring. It can be advisable to pass an inert gas, for example nitrogen, through the reaction mixture meanwhile in order to remove the water formed during the esterification reaction, or the lower alcohol formed, if an ester has been employed as a functionalized carboxylic acid derivative. It is also possible, if desired, to apply a slight vacuum at the end of the esterification reaction in order to isolate residual low-molecular cleavage products. The preferred temperature range for the melt condensation is 160°–200° C. It is also possible, however, to use other forms of polycondensation, for example interface polycondensation or polycondensation in solution, in suspension or without a diluent.

The epoxide mixtures, containing the polyesters of the formulae I, II or III are preferably employed in the form of adducts. This is effected by heating the appropriate polyester in a manner known per se together with the epoxide resin and, if appropriate, a suitable catalyst, so that a meltable, but still curable, precondensate is formed. The catalyst used is, for example, triphenylphosphine, tertiary amines, quaternary ammonium salts and, very particularly preferably, chromium acetylacetonate.

As a rule, the amounts of the polyester and epoxide components are so selected that there are at least two 1,2-epoxide groups of the epoxide resin for one free acid group or phenolic hydroxyl group of the polyester. The amount of catalyst is, as a rule, 0.1–5.0% by weight, relative to the total mixture.

As a rule, the viscosity of the adduct will be higher than the viscosity of the individual components. Cases are, however, observed in which the viscosity of the adduct is lower than the viscosity of the individual component having the highest figure; this is, as a rule, the polyester.

It is particularly preferably to employ adducts formed from the polyesters of the formulae I, II or III and diglycidyl ethers of 2,2-bis-(4-hydroxyphenyl)-propane or so-called advanced types based on 2,2-bis-(4-hydroxy)-propane diglycidyl ether and 2,2-bis-(4-hydroxyphenyl)-propane (solid resins based on bisphenol A).

In order to reduce the viscosity of the mixture, it is preferable to add diglycidyl ethers of 2,2-bis-(4-hydroxyphenyl)-propane to the adducts of polyesters of the formulae I, II or III with solid resins based on bisphenol A.

Adduct formation is preferably carried out with epoxide mixtures containing carboxyl-terminated polyesters, in order to increase the stability on storage of the mixture. In the case of the phenol-terminated polyesters of the formula IV, it is possible, as a rule, to dispense with adduct formation, since these epoxide mixtures generally have a satisfactory stability on storage. It is also possible, of course, to prepare adducts from epoxides and polyesters of the formula IV.

The invention also relates to a meltable, but still curable, precondensate which can be obtained by heating the composition, as defined above, in a manner known per se.

The amounts of the epoxide resin (a) and the polyester (b) in the compositions according to the invention are preferably so selected that the ratio of the carboxyl equivalents or the hydroxyl equivalents of the polyester (b) to the epoxide equivalents of the epoxide resin (a) is between 0.05 and 1.0, preferably between 0.1 and 0.8. Compositions containing 1–50% by weight, especially 5–25% by weight, of polyesters of the formula I, II, III or IV, relative to the total mixture, are very particularly preferred.

The curable compositions according to the invention can, of course, also contain additional curing agents (c) known to those skilled in the art, for example aliphatic, cycloaliphatic, aromatic and heterocyclic amines, such as bis-(4-aminophenyl)-methane, aniline-formaldehyde resins, bis-(4-aminophenyl) sulfone, propane-1,3-diamine, hexamethylenediamine, diethylenediamine, triethylenetetramine, 2,2,4-trimethylhexane-1,6-diamine, m-xylylenediamine, bis-(4-aminocyclohexyl)-methane, 2,2-bis-(4-aminocyclohexyl)-propane and 3-aminomethyl-3,5,5-trimethylcyclohexylamine (isophoronediamine); polyaminoamides, for example those formed from aliphatic polyamines and dimerized or trimerized fatty acids; polyphenols, such as resorcinol, hydroquinone or 2,2-bis-(4-hydroxyphenyl)-propane (bisphenol A), and phenol-aldehyde resins; polythiols, such as the polythiols available commercially under the name "Thiokols ®"; polycarboxylic acids and anhydrides thereof, for example phthalic anhydride, tetrahydrophthalic anhydride, hexahydrophthalic anhydride, hexachloroendomethylenetetrahydrophthalic anhydride, pyromellitic dianhydride, benzophenone-3,3',4,4'-tetracarboxylic dianhydride, the acids of the abovementioned anhydrides and also isophthalic acid and terephthalic acid. It is also possible to use curing agents having a catalytic action, for example tertiary amines [for example 2,4,6-tris-(dimethylaminoethyl)-phenol]; imidazoles or Mannich bases; alkali metal alcoholates (for example the Na alcoholate of 2,4-dihydroxy-3-hydroxymethylpentane); tin salts of alkanoic acids (for example tin octanoate); Friedel-Crafts catalysts, such as boron trifluoride and boron trichloride and complexes and chelates thereof obtained by reacting boron trifluoride with, for example, 1,3-diketones; and substituted cyanamides, such as dicyandiamide; or substituted ureas containing aromatic radicals, such as N-(4-chlorophenyl)-N,N'-dimethylurea, N-(2-hydroxyphenyl)-N,N'-dimethylurea, N-(3-chloro-4-methylphenyl)-N,N'-dimethylurea (chlorotoluron) or 2,4-bis-(N,N'-dimethylureido)-toluene.

Curing can be carried out at fairly low or fairly high temperatures. In general, the curing temperatures are between 80° and 250° C., preferably between 100° and 180° C. If desired, curing can also be carried out in two stages, for example by interrupting the curing process or, if a curing agent for fairly high temperatures is employed, allowing the curable mixture to cure partially at fairly low temperatures. The products obtained thereby are still meltable and soluble precondensates (so-called "B-stage resins") and are suitable, for example, for use as compression moulding materials, sintering powders or prepregs.

If desired, the viscosity can be further reduced by adding to the curable mixtures reactive thinners, for example styrene oxide, butyl glycidyl ether, 2,2,4-trimethylpentyl glycidyl ether, phenyl glycidyl ether, cresyl glycidyl ether or glycidyl esters of synthetic, highly branched, mainly tertiary, aliphatic monocarboxylic acids. Further customary additives which the mixtures according to the invention can contain are plasticizers, extenders, fillers and reinforcing agents, for example coal tar, bitumen, textile fibres, glass fibres, asbestos fibres, boron fibres, carbon fibres, mineral silicates, mica, powdered quartz, hydrated aluminium oxide, bentonite, kaolin, silica aerogel or metal powders, for example aluminium powder or iron powder, and also pigments and dyes, such as carbon black, oxide pigments and titanium dioxide, flameproofing agents, thixotropic agents, flow control agents, such as silicones, waxes and stearates, which can also in some cases be used as mould release agents, adhesion promoters, antioxidants and light stabilizers.

The mixtures according to the invention are used, for example, as adhesives or for the preparation of cured products, such as composite materials and laminates. They can be used in a formulation adapted in each case to suit the particular field of use, in an unfilled or filled state, for example as paints, coating compositions, lacquers, compression moulding materials, dipping resins, casting resins, impregnating resins, laminating resins, matrix resins and adhesives.

The invention also relates to the use of the polyesters of the formulae I, II, III or IV as plasticizers for epoxide resins.

The invention also relates to the use of compositions containing epoxide resins and polyesters of the formulae I, II and III in which at least 70% by weight of the radicals $R^1$ or $R^3$, relative to the total amount of these radicals, are dimeric fatty acid(s) or, in the case of $R^1$, also trimeric fatty acid(s), or to the use of adducts formed from epoxide resins and the said polyesters as an adhesive, especially for bonding oily steel.

The following examples illustrate the invention in detail.

(A) General Operating Instructions for the Preparation of Polyesters

Type I:

1 mole of the dihydroxyl-terminated polyalkylene oxide is heated with 2 moles of a dicarboxylic acid for 4 hours at 200° C., and for a further hour at 150 mbar in order to complete the condensation.

Type II:

1 mole of the dihydroxyl-terminated polyalkylene oxide is heated with 2 moles of a tricarboxylic acid for 4 hours at 200° C. and for one hour at 200° C. and 150 mbar.

Type III:

1 mole of the dihydroxyl-terminated polyalkylene oxide is subjected to condensation with an amount <2 moles of a dicarboxylic acid for 4 hours at 200° C. and for one hour at 200° C./150 mbar.

Type IV:

1 mole of the dihydroxyl-terminated polyalkylene oxide is esterified with 2 moles of hydroxybenzoic acid (or ethyl hydroxybenzoate) for 4 hours at 200° C. and for 1 hour at 200° C./150 mbar.

The polyesters prepared and 1:1 (weight) mixtures of these polyesters with a diglycidyl ether based on bisphenol A (BPDG; epoxide value: 5.4 equivalents/kg) are collated in the following table:

TABLE 1

Carboxyl-terminated and phenol-terminated polyesters

| Example No. | Type | Composition (3), (4), (5) | End group | Acid number (equivalents/kg) | $M_n$ (1) | $M_w/M_n$ (1) | Viscosity $\eta_{25}$ (2) (mPas) | 1:1 Mixture with BPDG $\eta_{25}(2)$ (mPas) |
|---|---|---|---|---|---|---|---|---|
| 1 | IV | 1M of PolyTHF 650<br>2M of 4-hydroxybenzoic acid | —⟨⟩—OH | 1.94 | 919 | 2.0 | 1680 | 4800 |
| 2 | III | 1.5M of PolyTHF 650<br>2M of Pripol® 1013 | —COOH | 0.65 | 3350 | 2.6 | 19520 | 13120 |
| 3 | I | 1M of PolyTHF 650<br>2M of Pripol® 1013 | —COOH | 1.13 | 2320 | 2.3 | 8970 | 10880 |
| 4 | I/II | 1M of PolyTHF 1000<br>2M of Pripol® 1022 | —COOH | 0.85 | 2960 | 3.5 | 22400 | 14720 |
| 5 | I | 2M of Pripol® 1013<br>1M of PolyTHF 1000 | —COOH | 1.11 | 2300 | 2.9 | 16960 | 12480 |
| 6 | II | 2M of Pripol® 1040<br>1M of PolyTHF 1000 | —COOH | 1.48 | 3100 | 3.2 | 64000 | 32640 |
| 7 | I/II | 1M of Pripol® 1017<br>0.5M of PolyTHF 1000 | —COOH | 1.12 | 2600 | 2.8 | 15700 | 12480 |
| 8 | II | 1M of Pripol® 1040<br>0.5M of PolyTHF 2000 | —COOH | 1.07 | 4000 | 4.3 | 110080 | 44800 |
| 9 | III | 0.8M of Pripol® 1017<br>0.58M of PolyTHF 1000 | —COOH | 0.76 | 2980 | 2.6 | 12800 | 14080 |
| 10 | I/II | 1M of Pripol® 1017<br>0.5M of PPG 2000 | —COOH | 1.5 | 2240 | 2.1 | 3200 | 5520 |
| 11 | I/II | 2M of Pripol® 1017<br>1M of PPG 1000 | —COOH | 1.25 | 2130 | 2.2 | 6480 | 8960 |
| 12 | I/II | 2M of Pripol® 1017<br>1M of PolyTHF 1000 | —COOH | 1.07 | 2280 | 2.9 | 23680 | 17920 |
| 13 | IV | 0.5M of PPG 2000<br>1M of HO—⟨⟩—COOH | —⟨⟩—OH | 1.09 | 1200 | 46 | 2160 | 3440 |
| 14 | II | 0.5M of PPG 2000<br>1M of Pripol® 1040 | —COOH | 1.02 | 2860 | 2.3 | 12960 | 10240 |
| 15 | I/II | 2M of Pripol® 1017<br>1M of PolyTHF 1000 | —COOH | 1.13 | 2240 | 3.2 | 16300 | 12600 |
| 16 | II | 2M of Pripol® 1040<br>1M of PolyTHF 1000 | —COOH | 0.75 | 1260 | 11.3 | 8960 | 23360 |
| 17 | II | 1M of Pripol® 1040<br>0.5M of PPG 2000 | —COOH | 0.88 | 4140 | 3.3 | 26800 | 9900 |

(1) Determined by gel permeation chromatography
(2) Measured using he Epprecht viscometer
(3) PolyTHF denotes HO—[(CH$_2$)$_4$O]$_n$—H; the numerical data relate to the average molecular weights (number average)
(4) Pripol® 1013 = dimeric fatty acid
   Pripol® 1040 = trimeric fatty acid Pripol® 1017 = ⎫
Pripol® 1022 = ⎭ mixture of dimeric and trimeric fatty acid (5) PPG denotes HO—[C(CH$_3$)—CH$_2$—O]$_n$—H; the numerical data relate to the average molecular weights (number average)

(B) Examples of adducts

Bisphenol A diglycidyl ether (BPDG) having an epoxide content of 5.4 mol/kg is reacted with the carboxyl-terminated or phenol-terminated polyesters for 1 hour at 120° C. in the presence of 0.25% of triphenylphosphine catalyst. The adducts prepared are collated in the following table:

| Example No. | Polyester from Example No. | BPDG/ Polyester (wt./wt.) | Epoxide content (equivalents/kg) | Viscosity (mPas, at 25° C.) |
|---|---|---|---|---|
| 18 | 2 | 50/50 | 2.3 | 37210 |
| 19 | 9 | 60/40 | 2.2 | 19840 |

(C) Use examples: Bonding steel and aluminium sheets (C1) 16.6 g of the adduct described in Example 18 are mixed on a triple roll mill with 100 g of bisphenol A diglycidyl ether (5.4 equivalents of epoxide/kg), 7.57 g of dicyandiamide, 2.27 g of chlorotoluron and 1.0 g of pyrogenic silica. The mixture obtained has a viscosity of 16640 cP at 25° C., measured using an Epprecht viscometer, and the following characteristic data.

Gel time 3.5 minutes at 160° C., measured on a gel time plate.

27.3 N/mm² tensile shear strength when bonding degreased, sand-blasted aluminium test specimens 1.5 mm thick (cured for 30 minutes at 160° C.)

19.6 N/mm² tensile shear strength on degreased steel test specimens 1.5 mm thick (cured for 30 minutes at 160° C.).

115° C. glass transition temperature, measured by dynamic mechanical spectroscopy[1] on a prepreg prepared by hand-laminating the adhesive mixture onto glass fabric (CS 7628) and curing for 30 minutes at 180° C. under a pressure of 15 bar.

(C2) 16.6 g of the adduct described in Example 18 are
[1] Measured using a Du Pont 9900 apparatus. mixed on a triple roll mill with 100 g of bisphenol A diglycidyl ether (5.4 equivalents of epoxide/kg), 7.57 g of dicyandiamide, 2.27 g of chlorotoluron and 8.0 g of pyrogenic silica, and the mixture is applied to degreased aluminium strips previously treated for 30 minutes at 65° C. with a wash solution consisting of 40 l of demineralized water/7.55 l of concentrated sulfuric acid (d=1.88)/2.5 kg of chromic acid/3.0 g of copper turnings, and rinsed for 15 minutes with demineralized water. After curing for 30 minutes at 180° C. under a pressure of 30 bar, the peel strength is found to be 9.2 kN/m.

(C3) The adhesive mixture described in Example C1 is used to bond degreased steel test specimens 1 mm thick. Some of the test specimens obtained in this way are stored in demineralized water for 7 days at 71° C.. Other test specimens are stored for three weeks in a varied programme of 24 hours in salt spray (50 g of NaCl/l of demineralized water) at 35° C., then 96 hours in condensate at 40° C. and 100% humidity and finally 48 hours at room temperature.

The following tensile shear strength values are found: 19.6 N/mm² initial tensile shear strength 15.0 N/mm² after 7 days of storage in water at 71° C. 12.3 N/mm² after 3 weeks of salt spray/condensate.

(C4) 100 g of bisphenol A diglycidyl ether (5.4 equivalents of epoxide/kg), 60 g of the adduct described in Example 18, 7.57 g of dicyandiamide, 2.27 g of chlorotoluron and 8.0 g of pyrogenic silica are mixed on a triple roll mill. A layer 300 μm thick is then applied by means of a film applicator to a steel sheet 1 mm thick, and is cured for 30 minutes at 180° C. The sheet is then bent over a mandrel of diameter 4 cm at room temperature and at −40° C.. No cracks are formed at either temperature.

(C5) 61 g of an adduct prepared at 120° C./2 hours in the presence of 0.13 g of triphenylphosphine from 25 g of a polyester according to Example 7 and 36 g of an epoxide resin based on bisphenol A (2.15–2.22 equivalents of epoxide/kg) are mixed in a kneader with 15.2 g of CaSiO₃, 15.2 g of Mg₃[(OH₂)/Si₄O₁₀], 0.6 g of glycidyloxypropyltrimethoxysilane, 1.6 g of dicyandiamide, 0.5 g of chlorotoluron, 2.4 g of epoxide resin based on bisphenol A (2.15–2.22 equivalents of epoxide/kg) and 3.5 g of pyrogenic silica.

This adhesive mixture is used to bond oiled steel test specimens 1 mm thick.

The pretreatment of the sheets is carried out as follows: the sheets are cleansed with acetone, immersed in a solution of 5 g of anti-corrosion oil (P80 oil made by Pfindlers Nachf.) and 95 g of heptane and dried for 16 hours at 50° C.

Curing is carried out at 180° C./30 minutes.

The bonded test specimens are stored for 12 weeks at 70° C./90% humidity and then for 2 hours at −20° C.

In addition, the bonded test specimens are stored for 480 hours in salt spray (50 g of NaCl/l of demineralized water).

Initial tensile shear strength on oily steel: 6.5 N/mm².

Tensile shear strength after storage in the alternating atmosphere test: 4.5 N/mm².

Tensile shear strength after storage in the salt spray test: 4.5 N/mm².

What is claimed is:

1. A curable, one-component adhesive composition which comprises
   (a) at least one compound having at least one 1,2-epoxide group in its molecule,
   (b) at least one compound of the formulae I, II, or III

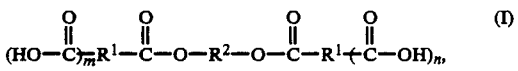

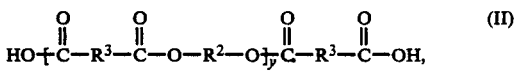

in which m and n independently of one another are 1 or 2, y is an integer from 2 to 10, p is 3 or 4, R¹, R³ and R⁴ are derived from radicals of aliphatic, cycloaliphatic or aromatic carboxylic acids, R¹ being a divalent or trivalent radical, R³ being a divalent radical and R⁴ being a trivalent or tetravalent radical, after the removal of the carboxyl groups, and R² is the radical of an aliphatic or cycloaliphatic diol after the removal of the two hydroxyl groups, subject to the proviso that at least 70% by weight of the radicals R¹ or R³, relative to the total amount of these radicals, are derived from dimeric and/or trimeric fatty acids, that at least 70% by weight of the radicals R², relative to the total amount of these radicals, are groups of the formula

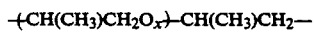

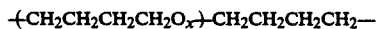

in which x is an integer from 5 to 40, or up to 30% by weight within a radical of the above formula R₂ can also be groups —CH₂CH₂Oₓ—CH₂CH₂—, and that the radicals R¹, R² and R³ can be different within the definitions given, and
   (c) dicyandiamide curing agent.

2. A composition according to claim 1, wherein component (a) is a polyglycidyl ether of bisphenols, novolaks or aliphatic diols.

3. A composition according to claim 1, having a viscosity less than 50,000 mPas (measured at 25° C. using the Epprecht viscometer).

4. A composition according to claim 1, wherein the indices m and n have identical values in each case.

5. A composition according to claim 1, wherein x is an integer from 8 to 40.

6. A composition according to claim 1, wherein y is an integer from 2 to 6.

7. A composition according to claim 1, wherein $R_2$ has the formula $$-CH_2CH_2CH_2CH_2O_x-CH_2CH_2CH_2CH_2-.$$

8. A composition according to claim 1, wherein the component (b) consists of compounds of the formula I or II.

9. A composition according to claim 1, wherein all the radicals $R^1$ or $R^3$ are derived from dimeric fatty acid(s) or, in the case of $R^1$, also from trimeric fatty acid(s).

10. A composition according to claim 1, wherein all the radicals $R^2$ are a group of the formula $$-(CH(CH_3)-CH_2)-O_xCH(CH_3)-CH_2- \text{ or}$$

$$-(CH_2-CH_2-CH_2-CH_2O_x)-CH_2-CH_2-CH_2-CH_2-,$$

x is an integer from 10 to 30 and y is an integer from 2 to 6.

11. A composition according to claim 8, wherein all the radicals $R^1$ or $R^3$ are derived from dimeric fatty acid(s) or, in the case of $R^1$, also from trimeric fatty acid(s), and all the radicals $R^2$ are derived from polybutylene glycol.

12. A composition according to claim 1, containing 1-50% by weight, relative to the total mixture, of polyesters of the formula I, II or III.

13. A meltable, but still curable, precondensate which is obtained by heating the composition according to claim 1.

* * * * *